United States Patent [19]
Boyle

[11] Patent Number: 5,875,734
[45] Date of Patent: Mar. 2, 1999

[54] AQUARIUM/TERRARIUM TERRAINING SYSTEM

[76] Inventor: Daniel Boyle, 101 Earle Ave., Lynbrook, N.Y. 11563

[21] Appl. No.: 760,720

[22] Filed: Dec. 5, 1996

[51] Int. Cl.$^6$ ..................................................... A04K 63/00
[52] U.S. Cl. ............................................................. 119/248
[58] Field of Search .................................... 119/248, 256, 119/473, 478, 507, 522

[56]  References Cited

U.S. PATENT DOCUMENTS

| | | | |
|---|---|---|---|
| 3,288,110 | 11/1966 | Goldman et al. | 119/248 |
| 3,512,503 | 5/1970 | Willinger | 119/251 |
| 4,081,666 | 3/1978 | Roehrick . | |
| 4,323,032 | 4/1982 | Halfon | 119/248 |
| 5,000,118 | 3/1991 | Merritt et al. | 119/246 |
| 5,144,909 | 9/1992 | Tominaga | 119/248 |
| 5,597,228 | 1/1997 | Boyle | 362/101 |

FOREIGN PATENT DOCUMENTS 2268383  1/1994  United Kingdom ................... 119/248

*Primary Examiner*—Thomas Price
*Attorney, Agent, or Firm*—Dilworth & Barrese

[57]   ABSTRACT

An aquarium/terrarium terraining system for providing at least two different terrain levels within the aquarium/terrarium. A substantially rectangular terraining partition of varying or adjustable height is securely inserted into the aquarium/terrarium and thereby creates a partition between front and back, or two sides or two other wall of the an aquarium or terrarium. The partition enables the creation of various terrain levels using gravel or other aquarium/terrarium fillers.

9 Claims, 6 Drawing Sheets

5,875,734

AQUARIUM/TERRARIUM TERRAINING SYSTEM

BACKGROUND OF THE INVENTION

1. Field of the Invention

The present invention relates to aquariums and/or terrariums. More particularly, it relates to a terraining system for creating at least one different terrain level in an aquarium and/or terrarium.

2. The Prior Art

The current landscape systems for aquariums/terrariums range from multi-colored gravel to the addition of plastic scenic layovers which fit on the back of the aquarium/terrarium or within them against the back side. These methods of providing scenery for the aquarium/terrarium are relatively inexpensive, but are cheap in appearance. In addition, these systems do not enable the creation of multiple terrain levels within the aquarium.

Applicant's co-pending application Ser. No. 08/475,468 discloses an Aquarium landscape system that includes a partition device for creating at least one different terrain level within the aquarium. The disclosed partition device is not adjustable in height and requires the sides of the aquarium for vertical disposal therein.

SUMMARY OF THE INVENTION

The present invention provides an aquarium/terrarium terraining system which enables the creation of multiple terrain levels within the aquarium/terrarium, and further allows the user to adjust the height of the partition device according to preference.

According to a first embodiment of the invention, a clear or transparent substantially rectangular partition is situated within an aquarium/terrarium. The partition has a length that is greater than the length between two sides or the front and back of the aquarium/terrarium, and as such is secured between opposite sides thereof in a bowed configuration.

In a second embodiment of the invention, the partition device has a length equal to or less than the length of the aquarium/terrarium, and includes stands or support members to retain the partition in a substantially vertical position with respect to the bottom. The support stands are variable in height to enable variable height adjustment according to the users preference.

In an alternative embodiment of the invention, the terraining system consists of two partition devices slidably engaged with one another such that the height of the partition device is infinitely adjustable within a preselected range of motion. One partition device has elongated slots for receiving threaded extensions extending from the other partition device. A nut is releasably threaded onto the extensions, and when tightened, secures the two partition devices at a desired height.

Included in the terraining system is a rubber attachment for the bottom of the partition device. The rubber attachment enables the placement of the partition device on an uneven surface, such as, for example, an under gravel filter. The rubber attachment provides a sealing engagement between the partition device and an uneven bottom surface.

It is therefore an object of the present invention to provide an aquarium/terrarium terraining system that enables the creation of at least two different terrains or levels within the aquarium/terrarium.

It is another object of the invention to provide an aquarium/terrarium terraining system that is adjustable in height according to the users preference.

It is a further object of the invention to provide an aquarium/terrarium terraining system that includes a rubber sealing that enables the partition device to be disposed on an uneven surface within the aquarium/terrarium.

Another object of the invention is to provide an aquarium landscape system that is easy to use and inexpensive to manufacture.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views:

FIG. 15b is a side view of the fourth embodiment of the terraining partition according to the invention;

DETAILED DESCRIPTION OF PREFERRED EMBODIMENTS

Figure 1:
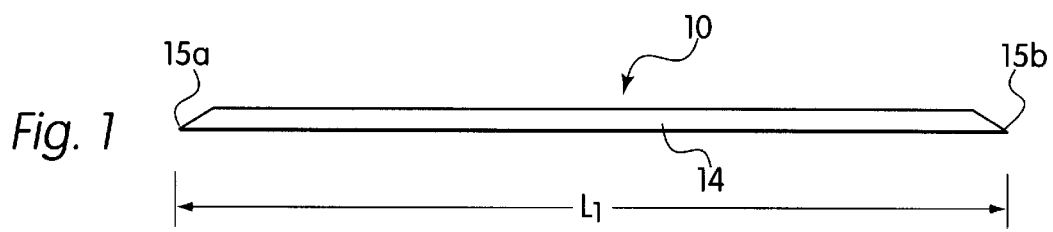
FIG. 1 is a top view of a first embodiment of the aquarium/terrarium terraining partition according to the invention.

Turning now in detail to the drawings, FIG. 1 shows the terraining partition 10 according to the first embodiment of the invention. Partition 10 has a top edge 14, side edges 15a and 15b, and a length $L_1$. Partition or fence 10 is made from plexi-glass or any other suitable known material that can perform the functions described herein. Partition 10 can be transparent, translucent or have any other light retention and reflection properties. Plexi-glass, or a transparent plastic of any color is preferable.

Figure 2:
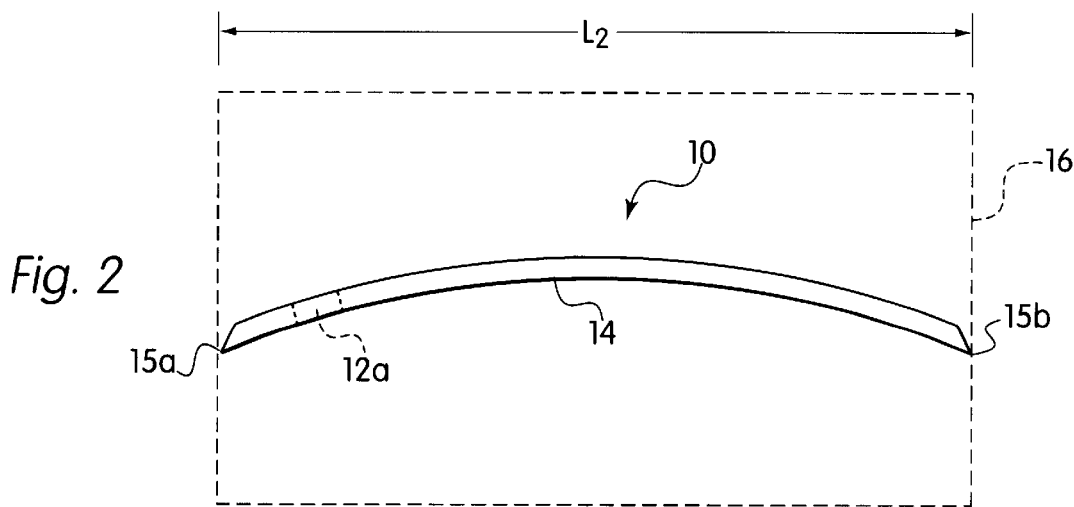
FIG. 2 is a top view of the partition as disposed withing an aquarium/terrarium according to the first embodiment of the invention.
Figure 16:
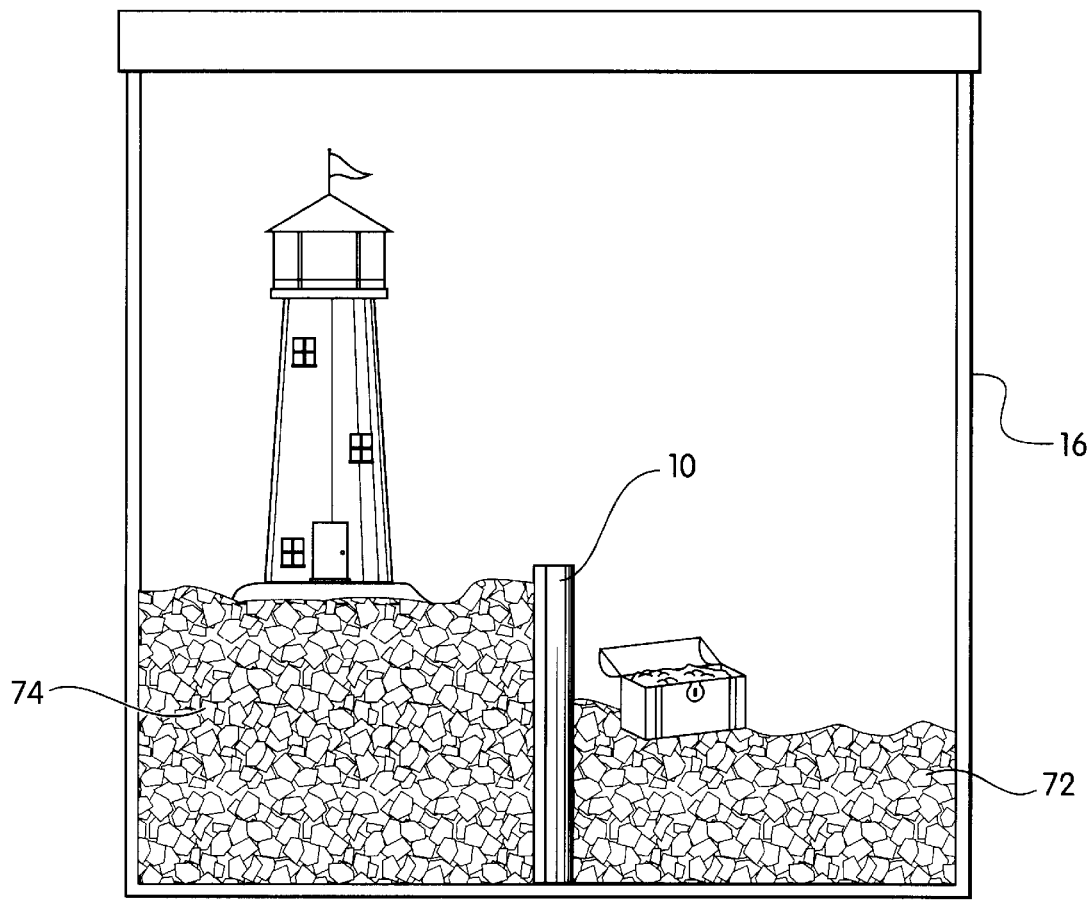
FIG. 16 is a side elevational view of an aquarium having the terraining partition disposed therein according to the first embodiment of the invention.
Figure 17:
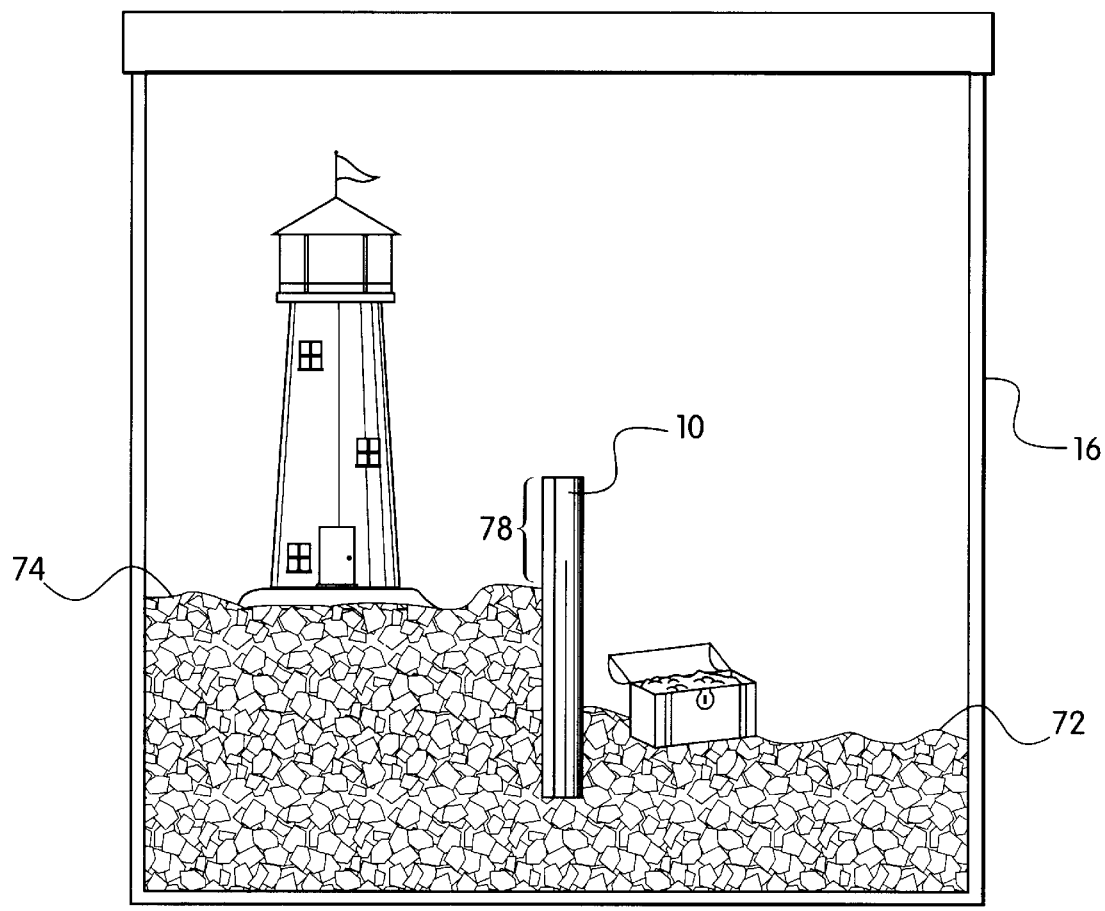
FIG. 17 is a side elevational view of an aquarium having the terraining partition disposed therein according to a modified first embodiment of the invention.

FIG. 2 shows partition 10 as mounted within an aquarium 16. In the first embodiment, partition 10 has a length $L_1$ slightly longer than the length of the aquarium $L_2$ such that when the partition is disposed within aquarium/terrarium 16, sides 15a and 15b frictionally engage the sides of the aquarium/terrarium and cause the partition to be in a bowed configuration (as shown). This extended length serves as a retaining means for securing partition 10 within the aquarium/terrarium 16. With one partition 10, at least two different terrains or gravel levels can be created within the aquarium/terrarium (FIGS. 16 and 17). Terraining partition 10 has a preferable height H of approximately 25% of the height of the aquarium/terrarium, but can have various heights to suit the needs of the user. Multiple partitions of varying height can be added to one aquarium/terrarium to provide three or more different terrains or levels.

Figure 3A:
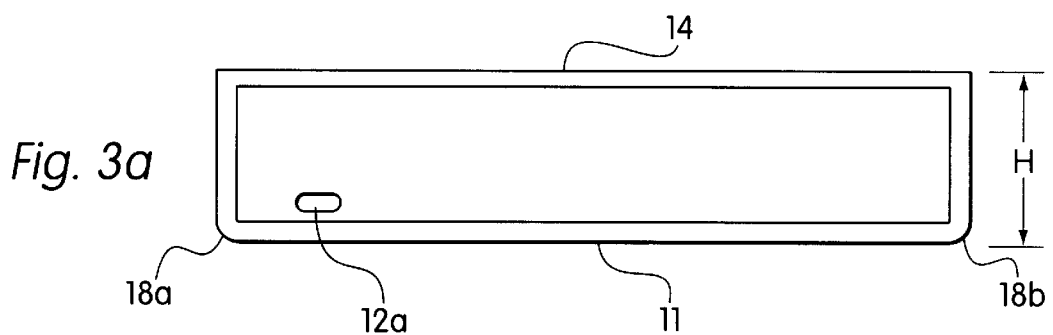
FIG. 3a is a front view of the partition according to an embodiment of the invention.
Figure 3B:
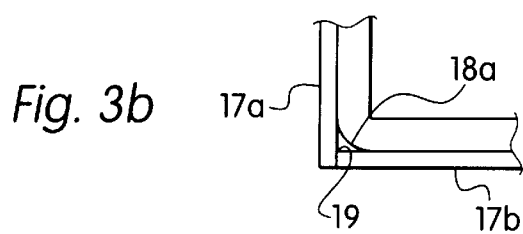
FIG. 3b is a detailed view of a corner of the terraining partition as disposed within an aquarium/terrarium.

FIGS. 3a and 3b show partition 10 having a bottom edge 11 and rounded bottom corner edges 18a and 18b. FIG. 3b shows an example of a side 17a and bottom 17b of an aquarium/terrarium. In order to join side 17a and bottom 17b at corner 19, typically silicon or another bonding agent having water sealing ability is used. Rounded corners 18a and 18b prevent partition device 10 from rubbing against and frictionally engaging the corners 19. This prevents partition 10 from causing the silicon or other bonding agent from coming loose or otherwise fail to perform its intended purpose.

Figure 6:
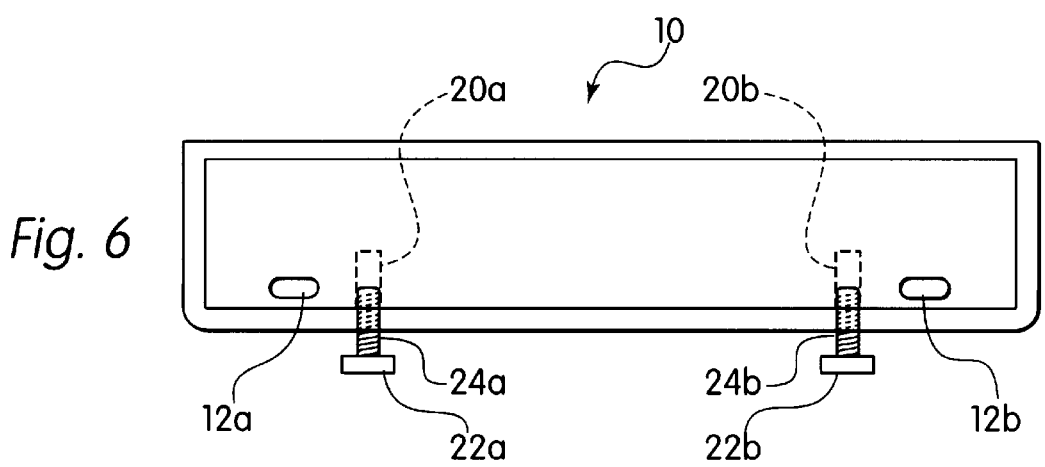
FIG. 6 is an elevational view of a first embodiment of a height adjustable terraining partition according to the invention.
Figure 7:
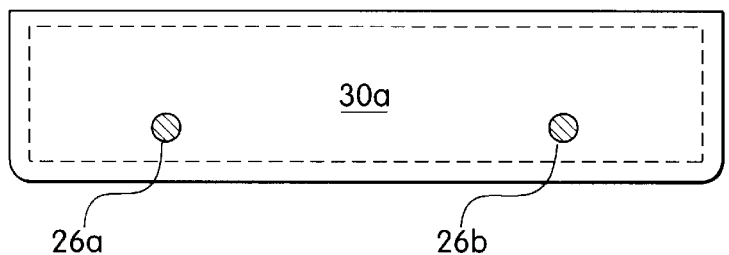
FIG. 7 is a rear elevational view of the first part of a height adjustable terraining partition according to a second embodiment thereof.
Figure 8:
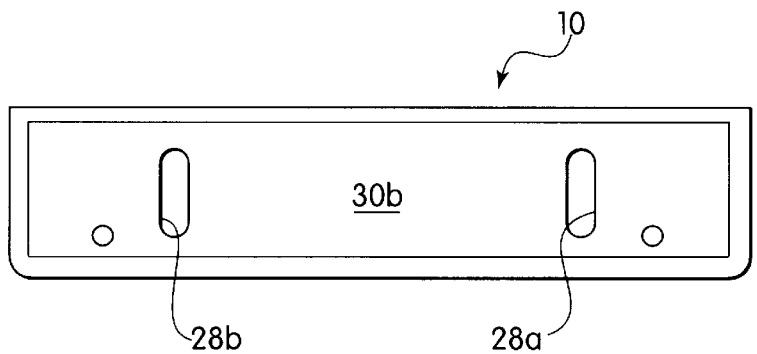
FIG. 8 is a front elevational view of the second part of the height adjustable second embodiment of the terraining partition according to the invention.
Figure 9:
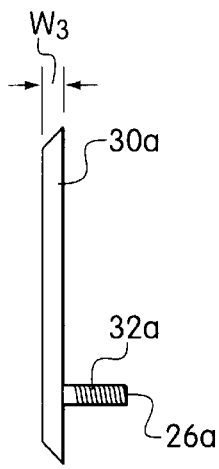
FIG. 9 is a side elevational view of the partition of FIG. 7 according to the invention.

Partition 10 can be disposed such that bottom edge 11 is adjacent to or resting on the bottom 17a of the aquarium/terrarium. As such, partition 10 is provided with apertures 12a and 12b (FIGS. 3 and 6). Apertures 12a and 12b can be of any desired size, and provide a passageway for air and filter lines through the partition.

Figure 4:
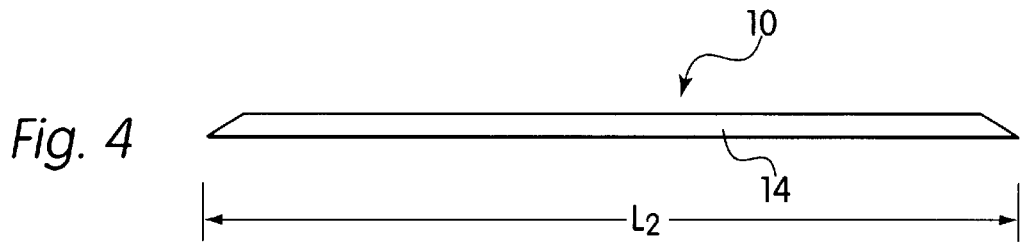
FIG. 4 is a top view of a second embodiment of the aquarium/terrarium terraining partition according to the invention.
Figure 5:
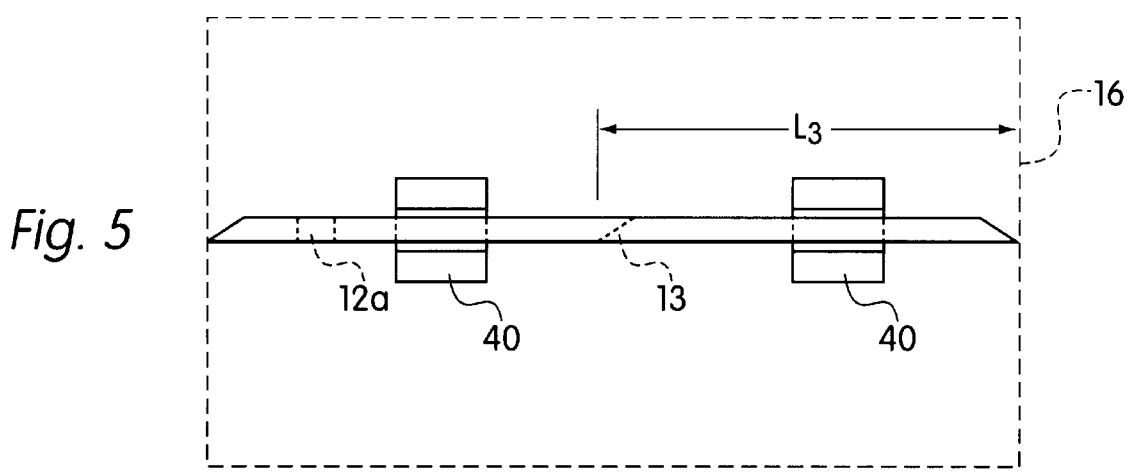
FIG. 5 is a top view of the second and a third embodiment of the terraining partition as disposed within an aquarium/terrarium according to the invention.

FIG. 4 shows a second embodiment of partition device 10 according to the invention. Partition device 10 has a length $L_2$ that is equal to or less than the length $L_2$ of aquarium/terrarium 16 (FIG. 2). FIG. 5 shows partition device 10 disposed within aquarium/terrarium 16 using support members 40. Support members 40 rest on the bottom of aquarium/terrarium 16 and retain partition device 10 in a substantially upright or vertical position within said aquarium/terrarium.

Support members 40 enable the length of partition 10 to be varied to any desired length, such as, for example Length $L_3$. The number of support members 40 required is dependent upon the length of partition 10. The smaller the length, the less support members needed.

Figure 12:
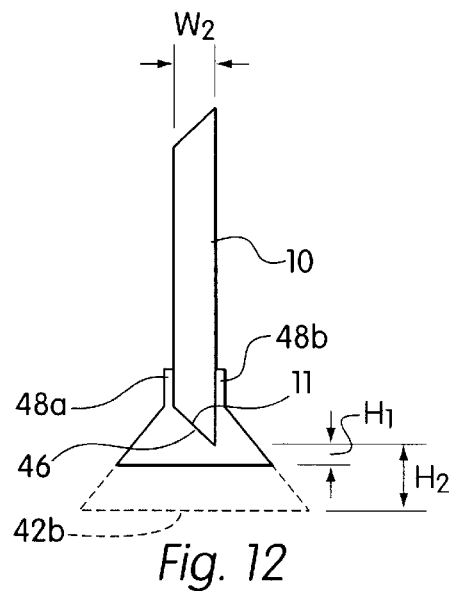
FIG. 12 is a side elevational view of the terraining partition as supported by the vertical support according to the invention.
Figure 11:
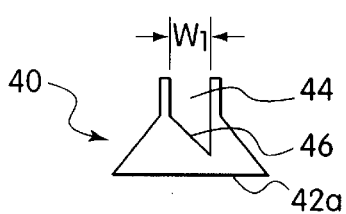
FIG. 11 is an elevational view of a vertical support for the terraining partition according to the second embodiment of the invention.
Figure 13:
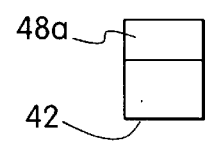
FIG. 13 is a front elevational view of the terraining partition vertical support according to the invention.

FIGS. 11–13 show support member 40 having a base 42a, a receptacle 44 defined by side supports 48a and 48b, and a receptacle base 46. As shown, the bottom end 11 is inserted into receptacle 44 such that said bottom frictionally abuts receptacle base 46. Receptacle 44 has a width $W_1$ slightly larger than the width $W_2$ of partition device 10 such that a secure frictional coupling or connection is made between the support and the bottom edge of the partition.

In an alternative embodiment not shown, when the length of partition 10 is L2, or equal to the distance between the sides of the aquarium/terrarium, support members could be used on side edges 15a and 15b of the partition to effectively retain said partition in an upright position.

FIG. 12 shows support member 40 having a height $H_1$ as being defined by the distance between base 42 and the lower most point of receptacle base 46. In various embodiments, support member 40 can have various heights, such as, for example, $H_2$ as shown. When the height is increased, the size of base 42b must be increased to prevent tipping and provide the same upright/vertical support to partition 10. The various heights of support member 40 enables the user to adjust the height at which partition 10 is situated within the aquarium/terrarium.

FIG. 6 shows another embodiment of a height adjustable partition device 10. Partition 10 includes threaded apertures 20a and 20b for receiving and retaining threaded supports 24a and 24b, respectively. Each threaded support 24a and 24b, have flat bottom heads 22a and 22b, respectively, that rest on the bottom of the aquarium/terrarium. The rotational movement of supports 24a and 24b enables the adjustment of the height of the partition device in either an upward or downward direction based on the rotation direction. Threaded supports 24a, and 24b can be made of plastic or any other suitable know material.

In another embodiment (not shown), flat bottom heads 22a and 22b are sufficiently large enough to support and maintain partition 10 in an upright position.

Figure 10:
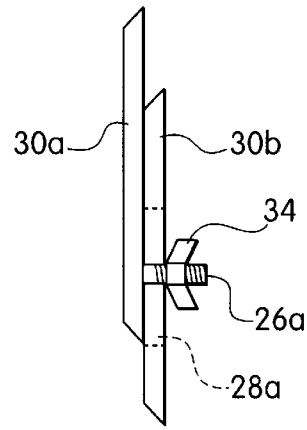
FIG. 10 is a side elevational view of the height adjustable second embodiment of the terraining partition according to the invention.

FIGS. 7–10 show another height adjustable embodiment of a partition device according to the invention. A first part 30a has threaded extensions 26a and 26b that extend outward from the rear of said part. A second part 30b has elongated slots 28a and 28b for slidably receiving threaded extensions 26a and 26b, respectively. Threaded extensions 26a and 26b are inserted through slots 28a and 28b, respectively, and are secured by a nut 34 (FIG. 10). Before nut 34 is tightened, partition parts 30a and 30b are slidably adjustable to a desired height. A similar system could be employed to provide a partition of adjustable length.

Partition part 30a has a width $W_3$ that is smaller that the width $W_1$ of the partition device 10 of the first embodiments of the invention. The decreased width $W_3$ for parts 30a and 30b, enable the combined parts to be bowed together and inserted into aquarium/terrarium 16 as shown in FIG. 2. In an alternative embodiment, width $W_3$ could be increased, and support members 40 could be used to retain the combined partition of parts 30a and 30b in a substantially vertical position.

Figure 14A:
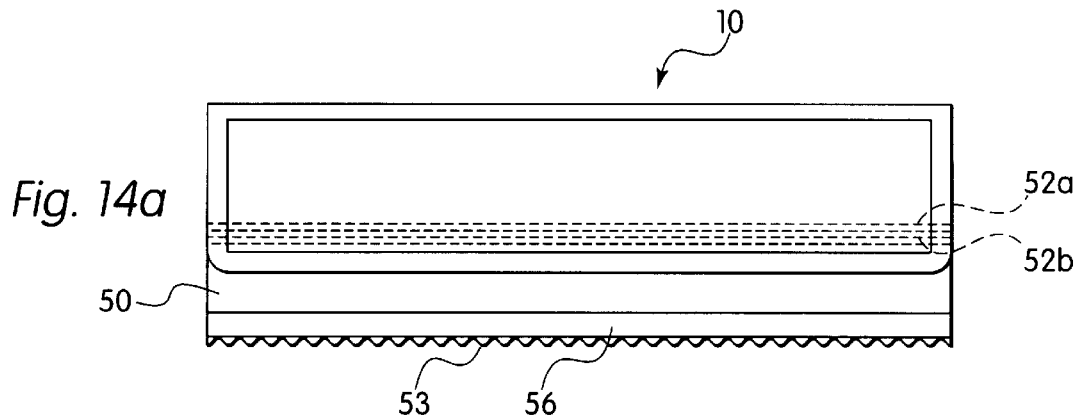
FIG. 14a is an elevational view of a third embodiment of the terraining partition according to the invention.
Figure 14B:
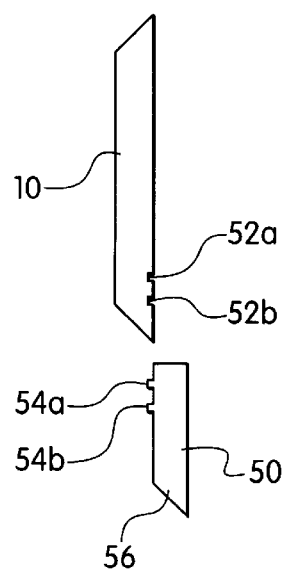
FIG. 14b is a side view of the third embodiment of the terraining partition according to the invention.

FIGS. 14a and 14b, show partition device 10 having a rubber attachment 50 for enabling said partition to be disposed on an uneven surface without damaging the surface or the bottom edge of the partition. For example, under gravel filters 53 generally have an uneven surface with conduits and other delicate parts. As such, rubber attachment 50 has a flexible bottom 56 that can safely engage the top of an under gravel filter 53, or any other uneven surfaced device without damage to the surface or the partition.

FIG. 14b shows rubber attachment 50 having an angled bottom 56, and two elongated extensions 54a and 54b.

Partition 10 has two elongated slots 52a and 52b that are designed to receive and retain extensions 54a and 54b and thereby secure rubber attachment 50 to partition device 10. The coupling of extensions 54a and 54b with slots 52a and 52b, respectively, may be any suitable known type of coupling that retains attachment member 50 to partition 10.

Figure 15A:
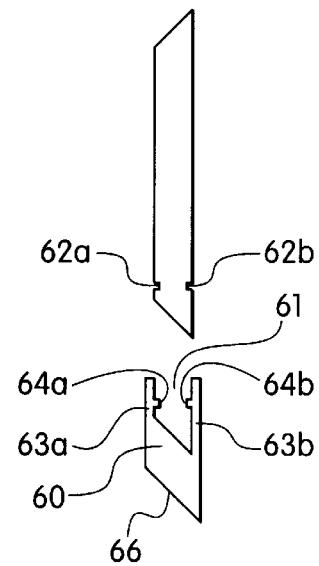
FIG. 15a is an elevational view of a fourth embodiment of the terraining partition according to the invention.
Figure 15A:
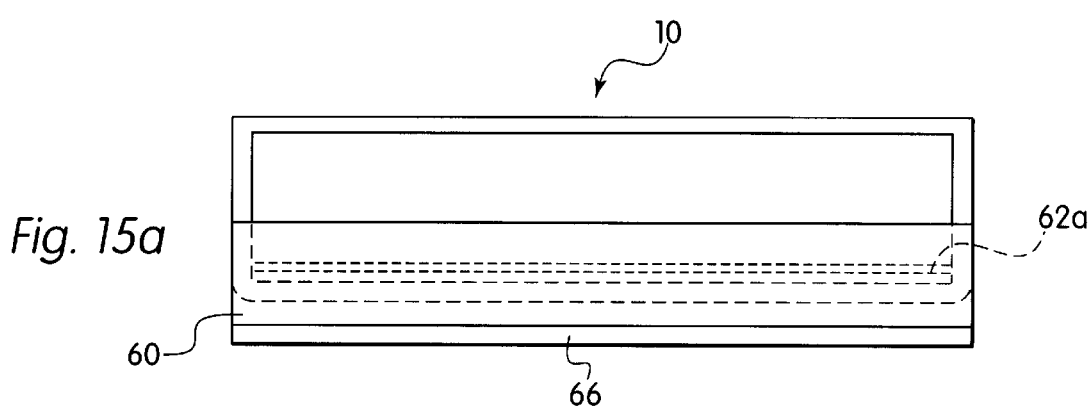

FIGS. 15a and 15b show another configuration for the addition of a rubber attachment 60 to partition device 10. Rubber attachment 60 has an upper receptacle 61 defined by sides 63a and 63b, and a flexible bottom 66 being angled similar to the bottom 11 of partition 10. Receptacle 61 receives the bottom of partition device 10 and further includes elongated extensions/nubs 64a and 64b disposed within said receptacle on sides 63a and 63b, respectively. Partition device 10 includes elongated slots 62a and 62b disposed on opposite sides thereof. Partition device 10 is inserted into receptacle 61 such that elongated slots 62a and 62b receive extensions/nubs 64a and 64b, respectively, and thereby retain attachment member 60 on the bottom of said partition. The coupling of extensions/nubs 64a and 64b with slots 62a and 62b, respectively, may be any suitable known type of coupling that retains attachment member 60 to partition 10.

FIG. 16 shows a side view of partition 10 as disposed within an aquarium/terrarium 60. Aquarium 60 has two terrains or levels of gravel 72 and 74 as separated by partition 10. Partition 10 can be made to any size to accommodate any size aquarium.

FIG. 17 shows an example of how partition 10 can be disposed above the bottom of the aquarium/terrarium to provide additional space 78 to increase the height of level 74.

The gravel 76 within aquarium 16 can be any gravel of suitable known type, such as, for example, transparent gravel of various colors, non-transparent gravel, etc.

While several embodiments of the present invention has been shown and described, it is to be understood that many changes and modifications may be made thereunto without departing from the spirit and scope of the invention as defined in the appended claims.

What is claimed is:

1. An aquarium/terrarium terraining system where the aquarium/terrarium has a bottom, and walls extending upward from the bottom, the terraining system comprising:

at least one partition device disposed within the aquarium/terrarium for creating at least two different terrains/levels within the aquarium/terrarium, said partition device having a height and a length and comprising a board having a top edge, a bottom edge, and two side edges, said length being defined by said side edges; and means for retaining said partition device in a substantially upright position with respect to the bottom of the aquarium/terrarium, said means for retaining comprising extending said length of said board such that said sides frictionally engage the walls of the aquarium/terrarium and cause said board to be disposed in a bowed configuration between the walls.

2. The terraining system according to claim 1, further comprising adjustment means for adjusting the height of said partition device.

3. The system according to claim 1, further comprising a flexible member coupled to said bottom edge of said partition device for providing said bottom edge with a flexible bottom surface; and attachment means for releasably securing said flexible member to said bottom edge.

4. The system according to claim 1, further comprising at least one aperture through said partition for enabling the passage of air and filter lines through said partition.

5. The system according to claim 4, wherein said at least one aperture is disposed near said bottom edge of said partition.

6. The system according to claim 1, wherein the partition device further comprises two bottom corners defined by said bottom edge and said side edges, said bottom corners being rounded.

7. An aquarium/terrarium terraining system for creating at least two different terrain levels within the aquarium/terrarium, the terraining system comprising:

a least one partition device having a height, a length, a top edge, a bottom edge and two side edges;

means for supporting said at least one partition device in a substantially upright position and being adapted to receive the bottom edge of said partition; and means for adjusting the height of said at least one partition device.

8. The system according to claim 7, wherein said means for supporting is releasably coupled to said bottom edge of said partition device, and further comprises a base for engaging a bottom of the aquarium/terrarium, two opposing sides, a receptacle for receiving said bottom edge, and having a floor, and a height.

9. The system according to claim 8, wherein said means for adjusting the height of said partition device comprises varying the height of said means for supporting.

* * * * *